(12) United States Patent
Kim et al.

(10) Patent No.: US 9,644,304 B2
(45) Date of Patent: May 9, 2017

(54) WASHING MACHINE

(71) Applicant: LG ELECTRONICS INC., Seoul (KR)

(72) Inventors: Hyeok Deok Kim, Changwon-si (KR); Soung Bong Choi, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 14/134,682

(22) Filed: Dec. 19, 2013

(65) Prior Publication Data
US 2014/0102152 A1    Apr. 17, 2014

Related U.S. Application Data

(62) Division of application No. 11/605,216, filed on Nov. 29, 2006, now Pat. No. 8,621,896.

(30) Foreign Application Priority Data

Nov. 30, 2005  (KR) .................. 10-2005-0115766
Nov. 30, 2005  (KR) .................. 10-2005-0115767
(Continued)

(51) Int. Cl.
*D06F 23/00*    (2006.01)
*D06F 37/30*    (2006.01)
(Continued)

(52) U.S. Cl.
CPC ......... *D06F 37/304* (2013.01); *H02K 1/2786* (2013.01); *H02K 1/28* (2013.01); *H02K 1/30* (2013.01)

(58) Field of Classification Search
CPC ........ H02K 1/30; H02K 1/2786; H02K 1/265; H02K 1/187; D06F 37/304
(Continued)

(56) References Cited

U.S. PATENT DOCUMENTS

| 4,219,752 A | * | 8/1980 | Katou | ...................... H02K 1/28 |
| | | | | 310/153 |
| 5,586,455 A | | 12/1996 | Imai et al. | |

(Continued)

FOREIGN PATENT DOCUMENTS

| DE | 198 49 594 C1 | 3/2000 |
| DE | 60025586 | 11/2006 |

(Continued)

OTHER PUBLICATIONS

German Office Action dated Apr. 23, 2014 issued in DE Patent Application No. 102006056418.9 with English Translation).

(Continued)

*Primary Examiner* — Katelyn Whatley
(74) *Attorney, Agent, or Firm* — KED & Associates, LLP

(57) ABSTRACT

A drum type washing machine is provided. The washing machine includes a tub, a drum rotatably installed in the tub, and a shaft that penetrates the tub and is connected to the drum so as to transmit a drive force of a motor to the drum. A stator is fixed to a rear wall of the tub, and an outer rotor, including at least one magnet, an annular back yoke, and a rotor frame, is rotatably disposed at the outside of the stator. The rotor frame may be made of an aluminum material, and includes a side wall portion and a rear wall portion integrally formed with the side wall portion.

13 Claims, 8 Drawing Sheets

(30) Foreign Application Priority Data

Nov. 30, 2005 (KR) .................. 10-2005-0115768
Nov. 30, 2005 (KR) .................. 10-2005-0115769

(51) Int. Cl.
*H02K 1/28* (2006.01)
*H02K 1/27* (2006.01)
*H02K 1/30* (2006.01)

(58) Field of Classification Search
USPC .......................................................... 68/140
See application file for complete search history.

(56) References Cited

U.S. PATENT DOCUMENTS

| | | | |
|---|---|---|---|
| 5,619,871 A * | 4/1997 | Forbes | D06F 37/304 68/23.7 |
| 5,737,944 A | 4/1998 | Nishimura et al. | |
| 5,778,703 A | 7/1998 | Imai et al. | |
| 5,808,390 A * | 9/1998 | Miyazawa | H02K 1/145 310/152 |
| 5,907,206 A | 5/1999 | Shiga et al. | |
| 6,049,930 A | 4/2000 | Hisano et al. | |
| 6,060,851 A * | 5/2000 | Imai | H02K 1/2786 318/437 |
| 6,148,647 A * | 11/2000 | Kabeya | D06F 37/304 68/140 |
| 6,396,177 B1 * | 5/2002 | Shin | H02K 1/2786 310/156.21 |
| 6,396,190 B1 | 5/2002 | Ahn et al. | |
| 6,460,382 B1 | 10/2002 | Kim et al. | |
| 6,510,716 B1 | 1/2003 | Kim et al. | |
| 6,564,594 B1 | 5/2003 | Ito et al. | |
| 7,114,355 B2 | 10/2006 | Kim et al. | |
| 7,131,178 B2 | 11/2006 | Kim et al. | |
| 7,166,950 B2 | 1/2007 | Kim et al. | |
| 7,171,715 B2 | 2/2007 | Yoon et al. | |
| 7,188,533 B2 | 3/2007 | Pattok et al. | |
| 7,305,857 B2 | 12/2007 | Kim et al. | |
| 7,397,158 B2 | 7/2008 | Lee et al. | |
| 7,441,423 B2 | 10/2008 | Kim et al. | |
| 7,443,064 B2 | 10/2008 | Kihara et al. | |
| 7,596,973 B2 | 10/2009 | Kim et al. | |
| 7,615,895 B2 | 11/2009 | Lee et al. | |
| RE42,621 E | 9/2010 | Kim et al. | |
| RE42,583 E | 8/2011 | Ahn et al. | |
| RE42,967 E | 11/2011 | Kim et al. | |
| RE43,196 E | 2/2012 | Kim et al. | |
| 2003/0132675 A1 | 7/2003 | Kwon et al. | |
| 2005/0125989 A1 | 6/2005 | Lee et al. | |
| 2005/0140232 A1 | 6/2005 | Lee et al. | |

FOREIGN PATENT DOCUMENTS

| | | |
|---|---|---|
| DE | 102006054558 | 8/2007 |
| EP | 1 061 261 A1 | 12/2000 |
| EP | 1 118 703 | 7/2001 |
| JP | 60156233 A * | 8/1985 |
| KR | 10-1998-0062007 | 10/1998 |

OTHER PUBLICATIONS

U.S. Office Action dated Oct. 2, 2009.
German Office Action issued in DE Patent Application No. 10200600560418.9-26 dated Mar. 31, 2010.
U.S. Final Office Action dated May 11, 2010.
U.S. Office Action dated Nov. 9, 2010.
U.S. Final Office Action dated May 23, 2011.
Notice of Allowance dated Sep. 4, 2013.

* cited by examiner

WASHING MACHINE

CROSS-REFERENCE TO RELATED APPLICATION(S)

This application is a divisional of Application No. 11/605,216 filed on Nov. 29, 2006, now patented and published as U.S. Patent No. 8,621,896, which claims the benefit of Korean Patent application Nos. 10-2005-0115766, 10-2005-0115767, 10-2005-0115768 and 10-2005-0115769 filed on Nov. 30, 2005, which are hereby incorporated by reference as if fully set forth herein.

BACKGROUND OF THE INVENTION

Field of the Invention

The present invention relates to a washing machine, and more particularly, to an improvement in the structure of a drive unit included in a drum type washing machine.

Discussion of the Related Art

Generally, drum type washing machines are designed to perform a washing operation by use of a frictional force between a drum and laundry as the drum is rotated by a drive force of a motor transmitted thereto in a state wherein the laundry is received in the drum together with wash water and detergent. The above described washing operation manner has several effects of causing damage to laundry as little as possible while preventing entangling of laundry and also providing excellent washing effects by pounding and rubbing.

Now, the configuration of a conventional drum type washing machine will be described in brief with reference to FIG. 1.

Referring to FIG. 1 illustrating the configuration of the conventional drum type washing machine in longitudinal sectional view, the conventional washing machine comprises a tub 2 installed in a cabinet 1 and a drum 3 rotatably installed in the center of the tub 2.

The tub 2 is mounted, at a lower side thereof, with a motor 5a and in turn, the motor 5a is connected to a motor pulley 18 by means of a shaft.

The drum 3 is mounted, at a rear side thereof, with a drum shaft, and a drum pulley 19 is mounted on the drum shaft.

The drum pulley 19 mounted on the drum shaft and the motor pulley 18 connected to the motor 5a are connected to each other by means of a belt 20 as a power transmission element.

The cabinet 1 is provided, at a front side thereof, with a door 21, and a gasket 22 is provided between the door 21 and the tub 2.

A hanging spring 23 is mounted between an inner ceiling surface of the cabinet 1 and an outer upper surface of the tub 2 and adapted to support the tub 2. Also, a friction damper 24 is mounted between an inner bottom surface of the cabinet 1 and an outer lower surface of the tub 2 and adapted to alleviate vibration of the tub 2 caused during a dehydrating operation.

In the above described conventional washing machine, a drive force of the motor 5a is transmitted to the drum 3 by way of the motor pulley 18, the drum pulley 19, and the belt 20 connecting the motor pulley 18 and the drum pulley 19 to each other. Such an indirect power transmission manner, however, has the following problems.

Firstly, since the drive force of the motor 5a is transmitted to the drum 3 through the belt 20 wound on both the motor pulley 18 and the drum pulley 19 rather than being directly transmitted to the drum 3, there is a high potential loss of energy in the transmission course of the drive force.

Secondly, in the course of transmitting the drive force of the motor 5a to the drum 3 through the above described several elements, such as the motor pulley 18, the drum pulley 19, and the belt 20, and the like, there inevitably exists a problem of severe noise as compared to the case where the drive force is directly transmitted to the drum 3.

Thirdly, a necessity for a great number of elements for transmitting the drive force of the motor 5a to the drum 3, such as the motor pulley 18, the drum pulley 19, the belt 20, and the like, consequently, causes a complicated product assembling operation.

Fourthly, the above described great number of elements for transmitting the drive force of the motor 5a to the drum 3 may result in a proportional increase in the number of potential failure areas, and this has a problem of increasing the generation frequency of failures.

In conclusion, due to the above described power transmission manner in which the drive force of the motor 5a is indirectly transmitted to the drum 3 only by way of the motor pulley 18, the belt 20, and the drum pulley 19, the conventional drum type washing machine has problems of a high potentiality of failures and noise generation as well as excessive consumption of energy and seriously, may result in deterioration in washing performance thereof, etc.

To solve the above described problems, the applicant of the present invention has proposed to use a direct connection type motor in a drive unit of a drum type washing machine, as disclosed in Korean Patent Laid-open Publication No. 10-2001-0037607.

In the above published patent invention, there is provided a rotor frame, which is formed by pressing an iron plate and installed to transmit a rotating force of a rotor to a drum directly while performing itself the function of a back yoke having a magnetic path. It could be found that the disclosed rotor frame has a capability of solving the above described problems of the indirect power transmission manner while achieving a simplified structure.

However, forming the rotor frame by pressing the iron plate has a difficulty, due to characteristics of a press operation, to obtain a required accuracy, more particularly, concentricity, when the thickness of the iron plate exceeds a predetermined value. On the other hand, when the rotor frame is formed by use of an iron plate having a thickness less than the predetermined value, there is a problem in that the rotor frame cannot obtain a required strength and may fluctuate during rotation.

Furthermore, to provide a passage of magnetic flux, that is to say, a magnetic path for the flow of magnetic flux generated by electric current flowing through coils of a stator, it is essential to provide a back yoke, which is made of a magnetic material and has an appropriate thickness, behind a magnet. Here, it is noted that the thinner the thickness of the back yoke, the lower a saturation point of the magnetic flux. Accordingly, when the rotor frame serving as the back yoke has a small thickness, there is a limit to increase the output of a motor even if the amount of current is increased to obtain a strong output.

Consequently, the attempt to form the rotor frame having the function of the back yoke by use of the iron plate in views of diversification of products reaches a limit due to the above described thickness problem of the rotor frame.

Also, due to characteristics of the iron plate, there is a risk in that the rotor frame tends to gather rust on its surface easily. The rust may cause deterioration in the strength of the rotor frame and in the worst case, there is a risk in that rust powder that falls from the rotor frame is attached in an air gap between the magnet and the stator, thereby acting to restrict rotation of the rotor.

In addition, the rotor frame, made of the iron plate, has a difficulty in the implementation of any subsequent process for improving accuracy and other processes.

SUMMARY OF THE INVENTION

Accordingly, the present invention is directed to a washing machine that substantially obviates one or more problems due to limitations and disadvantages of the related art.

An object of the present invention is to provide a drum type washing machine in which a drive unit, more particularly, a rotor frame that is adapted to transmit a rotating force of a rotor to a shaft directly, has an improved structure suitable to transmit a drive force of a motor to a drum directly, thereby achieving the effects of reducing the generation potential of noise and failure as well as excessive consumption of energy and of increasing the durability and stability of the washing machine.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a washing machine comprising: a tub for receiving wash water therein; a drum rotatably disposed in the tub and adapted to wash laundry received therein; a shaft penetrated through the tub to thereby be connected to the drum, the shaft being adapted to transmit a drive force of a motor to the drum; a stator coupled fixedly to a rear wall portion of the tub while being located on the rear wall portion; and an outer rotor including at least one magnet, an annular back yoke defining a magnetic path, and a rotor frame rotatably disposed at the outside of the stator, wherein the rotor frame of the outer rotor is made of an aluminum material, and comprises a side wall portion for supporting the magnet and the annular back yoke and a rear wall portion for transmitting a rotating force of the rotor to the shaft.

Preferably, the rotor frame is formed by die casting, and the side wall portion and the rear wall portion of the rotor frame are integrally formed with each other.

The back yoke may be press fitted and coupled fixedly inside the side wall portion of the rotor frame. For this, the rotor frame may further comprise a plurality of protrusions arranged inside the rotor frame to be spaced apart from one another by a regular distance in a circumferential direction of the rotor frame, the protrusions also being spaced apart in a radial inward direction from the side wall portion of the rotor frame by a predetermined distance. The protrusions may be integrally formed with the rotor frame.

To achieve a further increase in a coupling strength between the rotor frame and the back yoke, an adhesive may be applied to coupling surfaces of the rotor frame and the back yoke. Of course, the magnet may be attached to an inner surface of the back yoke by use of an adhesive, to be disposed in a circumferential direction of the back yoke.

In the present invention, the back yoke may be formed via a variety of methods. For example, the back yoke may be formed by rolling an iron plate, having a smaller thickness than a desired thickness of the back yoke, multiple times, to have a radially multilayered structure. Also, the back yoke may be formed by spirally winding an iron band, having substantially the same width as a desired thickness of the back yoke, from a lowermost layer to an uppermost layer, to have a vertically multilayered structure. Of course, it will be appreciated by those skilled in the art that, although the back yoke may be formed by stacking a plurality of annular iron bands one above another, this may result in excessive loss of material in association with the manufacture of the iron bands.

Meanwhile, the back yoke may be provided, at an outer surface thereof, with at least one radially-formed recess or protrusion, and the side wall portion of the rotor frame may be provided, at an inner surface thereof, with at least one protrusion or recess corresponding to the recess or protrusion of the back yoke, whereby the back yoke is coupled fixedly inside the side wall portion of the rotor frame via engagement between the protrusion and the recess.

For example, the back yoke may be provided, at an outer surface thereof, with at least one radially-formed recess, and the side wall portion of the rotor frame may be provided, at an inner surface thereof, with at least one protrusion corresponding to the recess of the back yoke, whereby the back yoke is coupled fixedly inside the side wall portion of the rotor frame via engagement between the protrusion and the recess.

Here, the protrusion of the rotor frame may have a smaller height than a height of the side wall portion of the rotor frame. Alternatively, the recess of the back yoke is replaced by a slot perforated in a lower end portion of the back yoke through a thickness of the back yoke so that the protrusion is inserted through the slot.

The back yoke may be provided, at an outer surface thereof, with at least one radially-formed protrusion, and the side wall portion of the rotor frame may be provided, at an inner surface thereof, with at least one recess corresponding to the protrusion of the back yoke, whereby the back yoke is coupled fixedly inside the side wall portion of the rotor frame via engagement between the protrusion and the recess.

Here, the protrusion of the back yoke may extend throughout a height of the back yoke.

The back yoke may be inserted into a mold of the rotor frame during die casting of the rotor frame, to thereby be coupled fixedly inside the side wall portion of the rotor frame.

The back yoke may be inserted into the mold after being previously coupled, at an inner surface thereof, with the magnet. In this case, the magnet as well as the back yoke can be coupled fixedly inside the rotor frame with an increased coupling force.

Preferably, the back yoke has at least one groove or protuberance formed at an outer surface thereof for increasing a coupling force between the back yoke and the rotor frame. Also, preferably, the groove or protuberance is formed at a middle height portion of the back yoke. This is because the groove or protuberance can prevent scattering of the back yoke, in addition to increase a coupling force between the back yoke and the rotor frame.

The side wall portion of the back yoke may have an upper end extended in a radial inward direction by a predetermined length to cover upper ends of the back yoke and the magnet.

The above described drum type washing machine according to the present invention has the following effects.

Firstly, the washing machine of the present invention has a direct connection motor and thus, has the effect of significantly reducing the generation of noise and failure as well as the loss of power. Also, with the use of a metallic bearing housing, the washing machine of the present invention is applicable to products having a high-temperature drying function, without the risk of thermal deformation.

Secondly, in the washing machine of the present invention, the rotor frame is made of an aluminum material and thus, has no risk of gathering rust thereon. This results in an increase in the durability of the motor. Furthermore, the rotor frame of the present invention has a magnet seating plane for achieving a highly efficient mounting operation of the magnet. Also, with the provision of vent holes having the function of moisture discharge and ventilation, it is possible to prevent overheating of the motor while protecting the motor from invasion of moisture. This consequently has the effect of increasing the reliability of the motor and extending the lifespan of the motor.

Thirdly, according to the present invention, the rotor frame is formed by die casting an aluminum material. Accordingly, the rotor frame can be manufactured with a simplified manner while guaranteeing an improved processability required for any subsequent process. Also, forming the rotor frame by use of a light-weight material is efficient to minimize the power loss of the motor due to the inertia force of the rotor frame. In addition, the aluminum rotor frame provides a flexibility to ensure free change in the thickness of the back yoke in views of diversification of products. This enables an increase in the overall thickness of the rotor frame and consequently, the rotor frame is free from unwanted fluctuation during rotation thereof, thus resulting in reduced noise and vibration.

Fourthly, according to the present invention, the back yoke can be secured easily and firmly to the rotor frame with a variety of methods, resulting in an improvement in the reliability and productivity of the washing machine.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, a motor, more particularly, a rotor frame constituting a rotor, is made of an aluminum material, and a back yoke for providing the rotor frame with a magnetic path may be coupled fixedly to the rotor frame with a variety of methods.

Now, a first embodiment of the present invention will be described in detail with reference to FIGS. 2 to 7.

Figure 1:
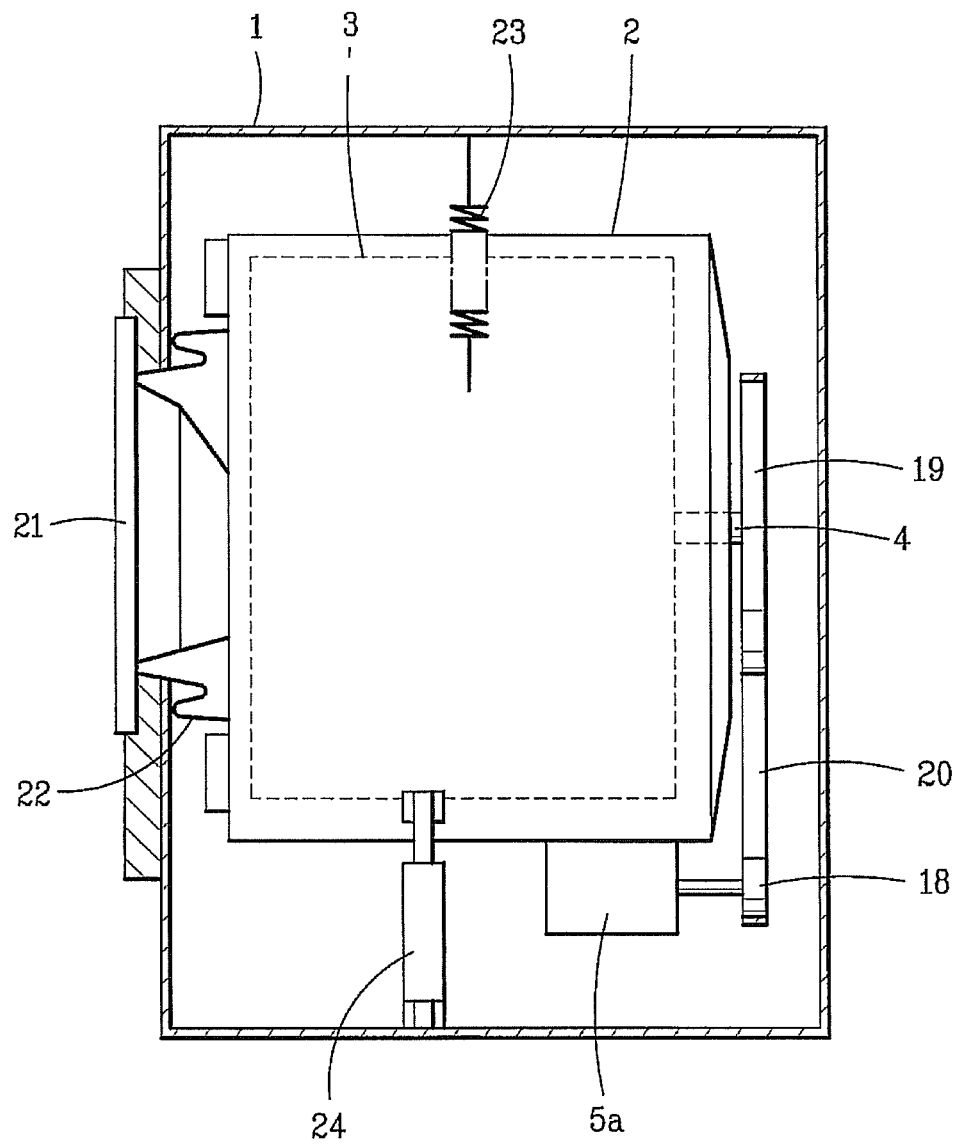
FIG. 1 is a longitudinal sectional view illustrating the configuration of a conventional washing machine.
Figure 2:
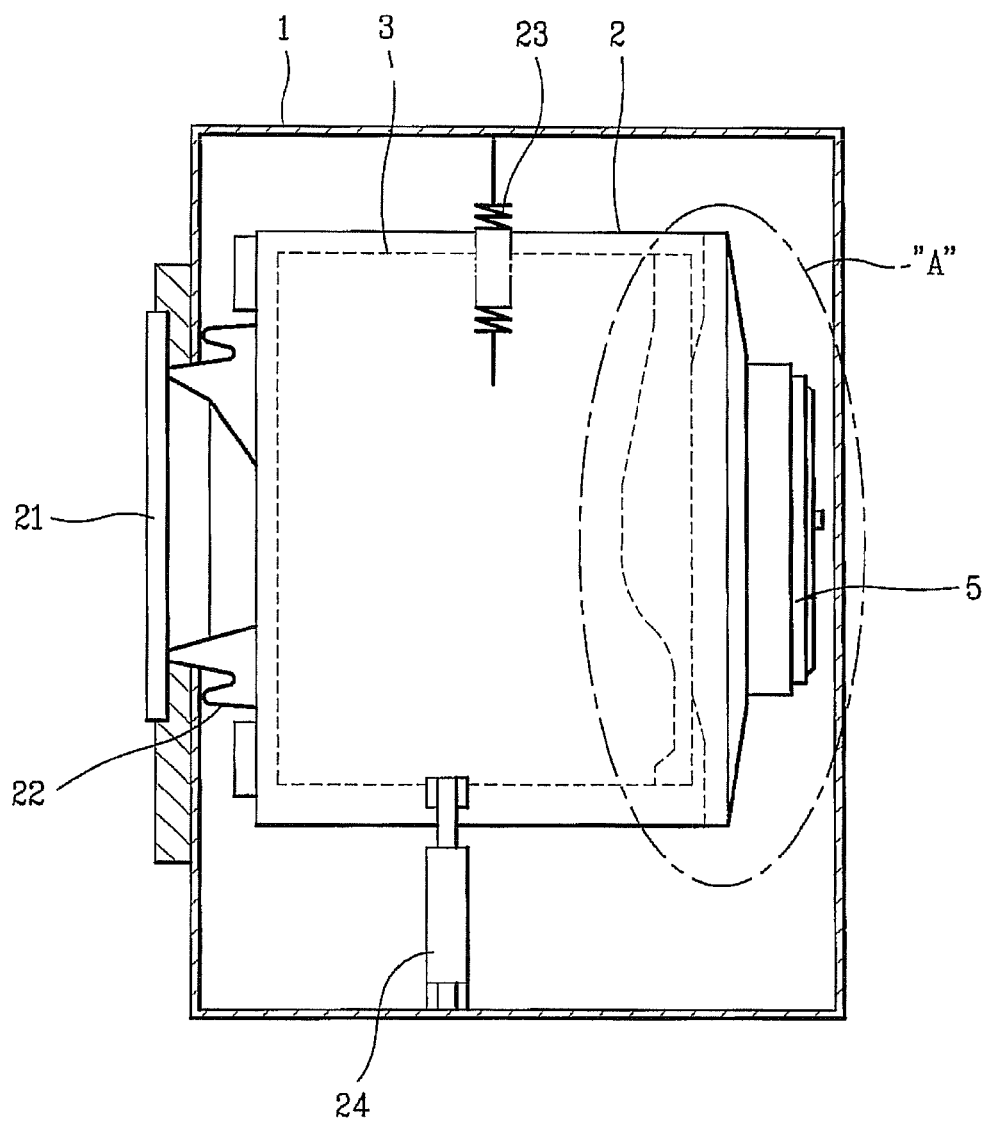
FIG. 2 is a longitudinal sectional view illustrating the configuration of a washing machine according to the present invention.
Figure 3:
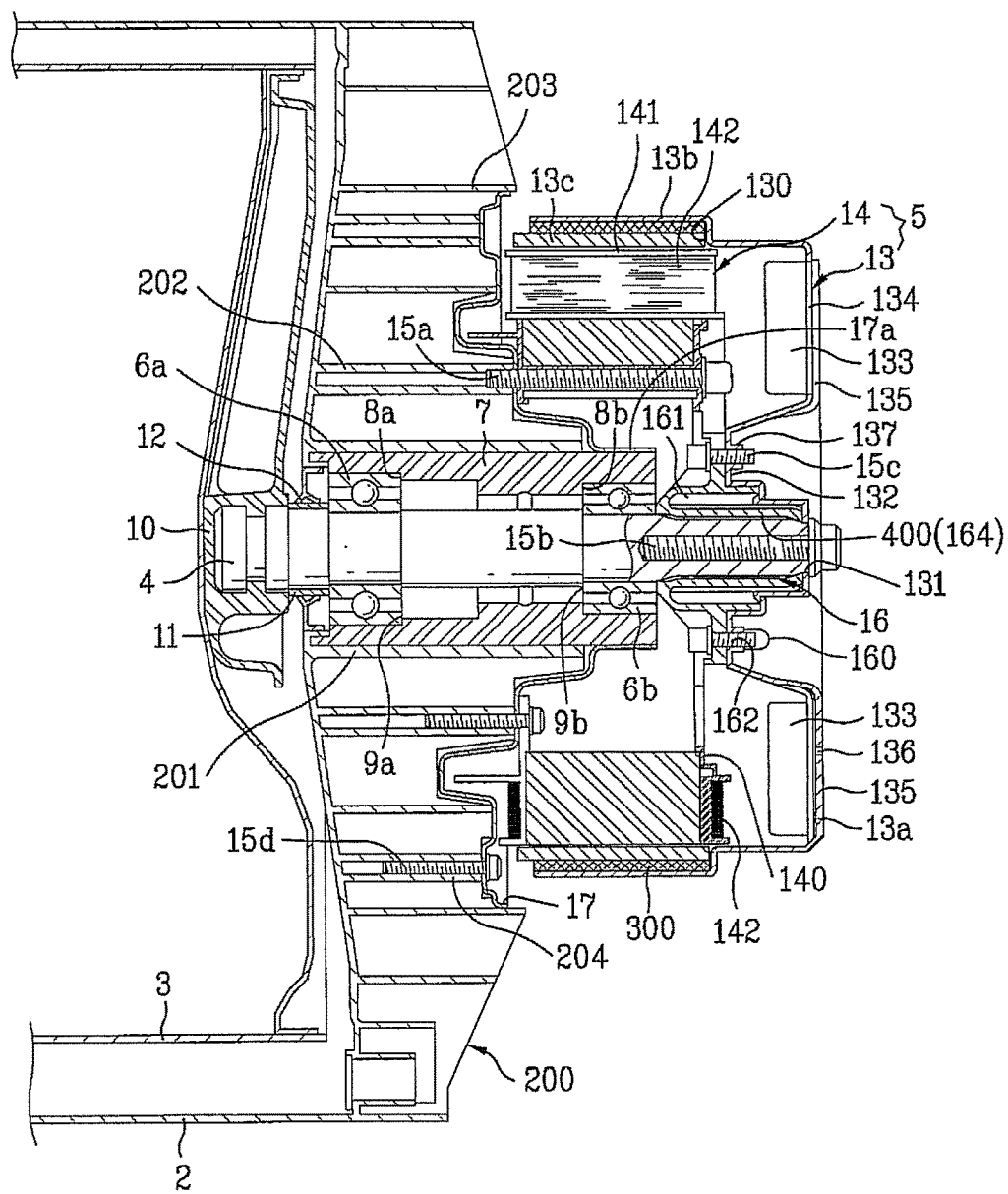
FIG. 3 is an enlarged longitudinal section view of the portion "A" of FIG. 2, illustrating the configuration of a drive unit included in the washing machine according to the present invention.

FIG. 2 is a longitudinal sectional view illustrating the configuration of a washing machine according to the present invention, and FIG. 3 is an enlarged detailed view of the portion "A" of FIG. 2, illustrating the configuration of a drive unit included in the washing machine according to the present invention.

Figure 4:
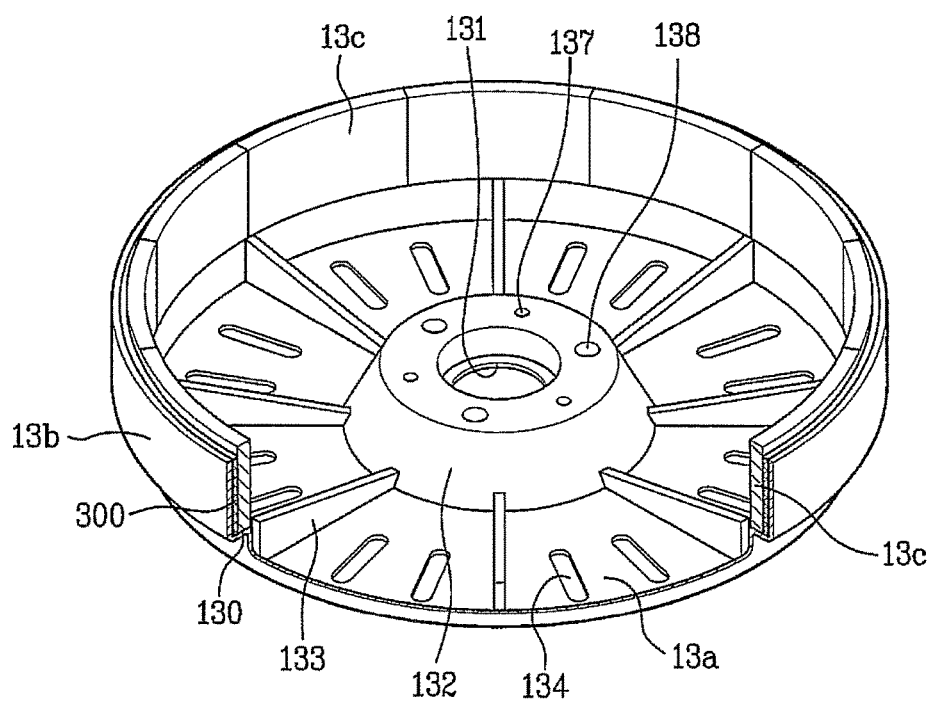
FIG. 4 is a partially cut-away perspective view illustrating a rotor shown in FIG. 3.
Figure 5:
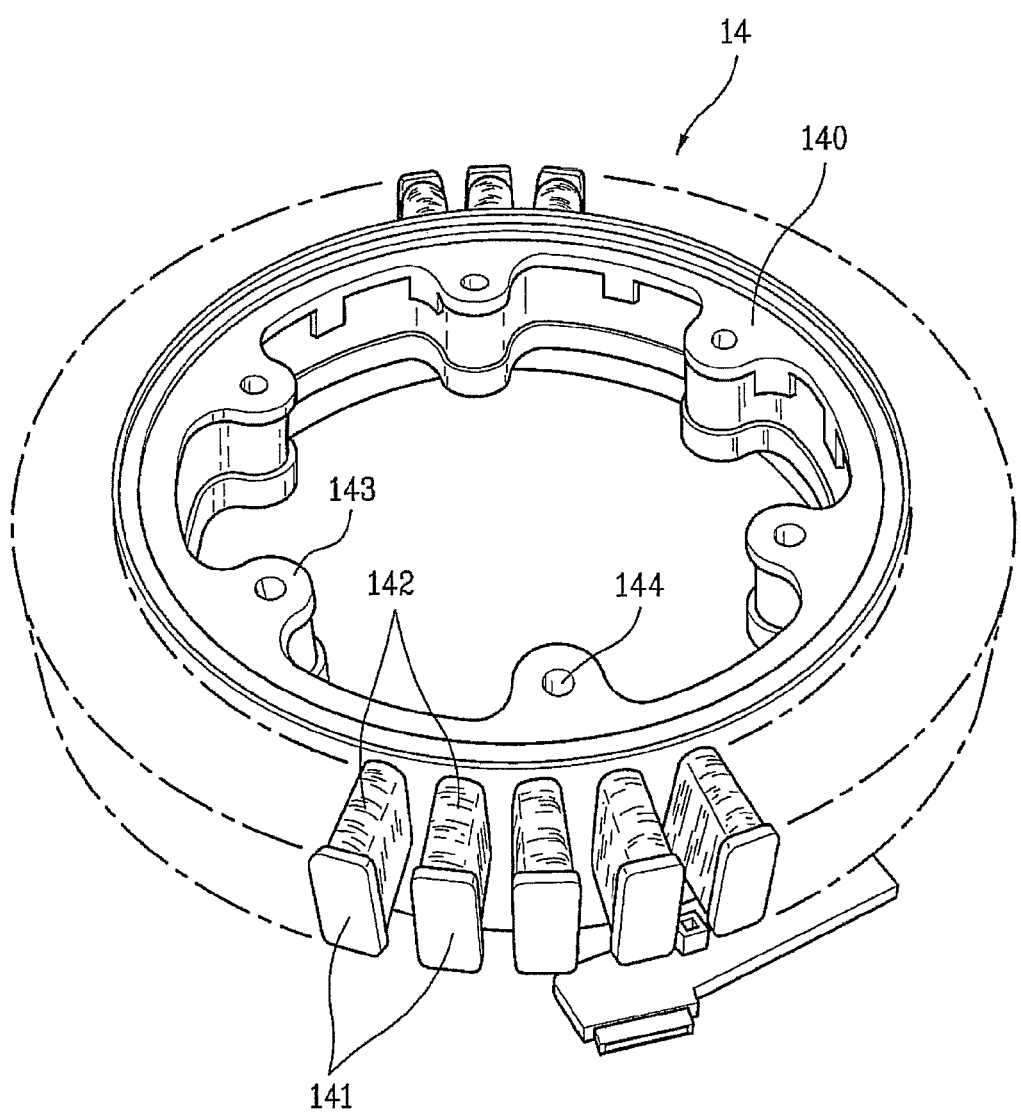
FIG. 5 is a perspective view illustrating a stator shown in FIG. 3.
Figure 6:
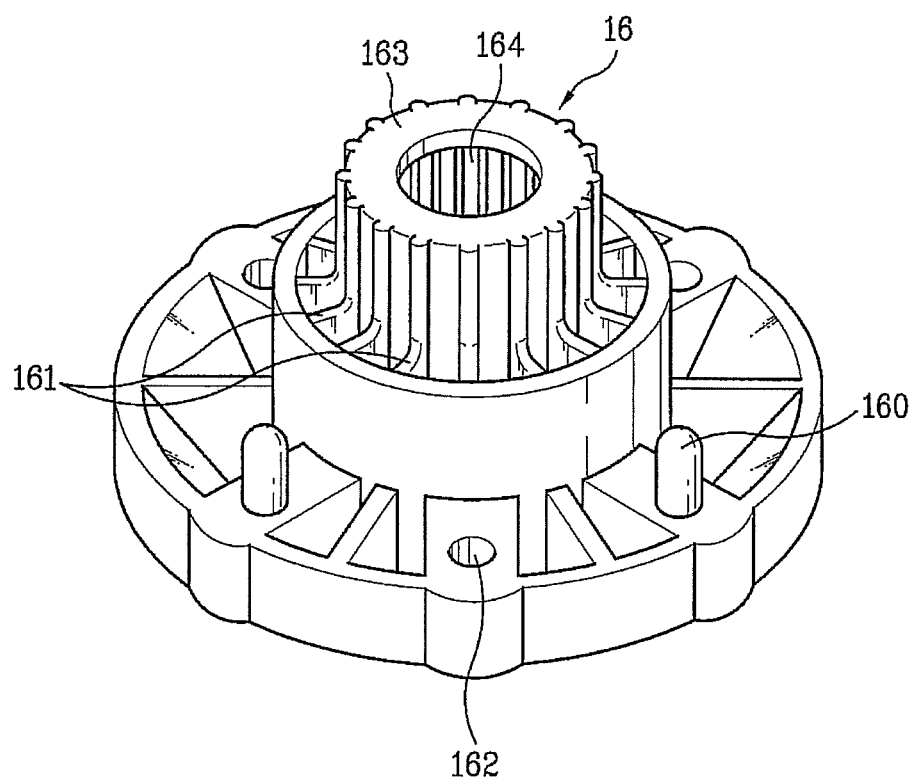
FIG. 6 is a perspective view illustrating a connector shown in FIG. 3.
Figure 7:
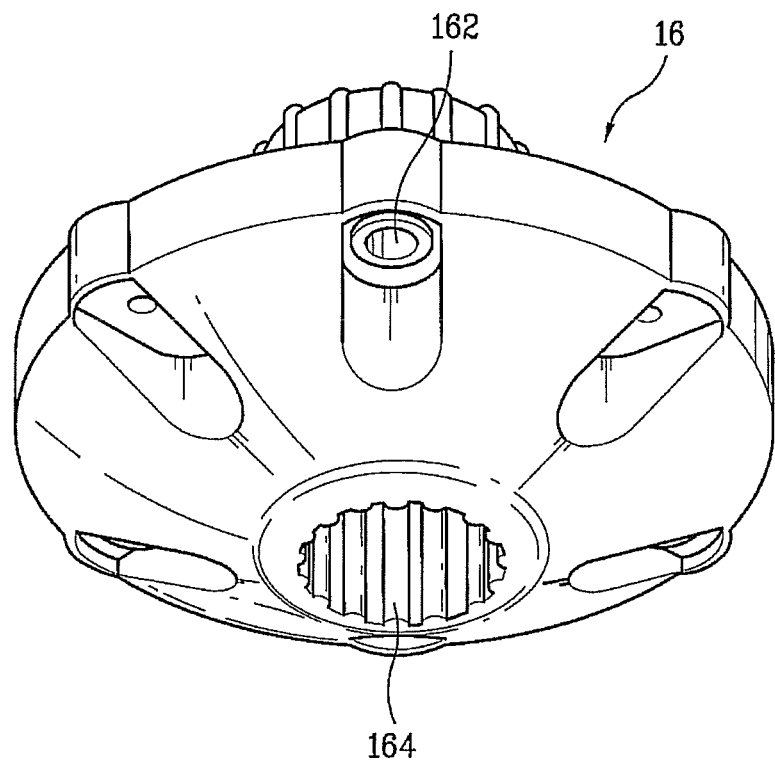
FIG. 7 is a bottom perspective view of FIG. 6.

FIG. 4 is a partially cut-away perspective view illustrating a rotor shown in FIG. 3, FIG. 5 is a perspective view illustrating a stator shown in FIG. 3, FIG. 6 is a perspective view illustrating a connector shown in FIG. 3, and FIG. 7 is a bottom perspective view of FIG. 6.

As shown in FIGS. 2 and 3, the washing machine according to the present embodiment comprises a tub 2 installed in a cabinet 1 and used to receive wash water therein, a drum 3 rotatably provided in the tub 2 and adapted to wash laundry received therein as it is rotated, a shaft 4 penetrated through the tub 2 and connected to the drum 3, the shaft 4 being adapted to transmit a drive force of a motor 5 to the drum 3, a stator 14 having winding portions around which coils are wound, the stator 14 being coupled fixedly to a rear wall surface 200 of the tub 2, and a rotor 13 at the outside of the stator 14.

The outer rotor 13 includes magnets 13c, an annular back yoke 300 defining a magnetic path, and a rotor frame.

The rotor frame has a side wall portion 13b and a rear wall portion 13a. The side wall portion 13b serves to support the magnets 13c and the back yoke 300, to allow the magnets 13c and the back yoke 300 to rotate at the outside of the stator 14. The rear wall portion 13a serves to transmit a rotating force of the magnets 13c and the back yoke 300 to the shaft 4.

Preferably, both the side wall portion 13b and the rear wall portion 13a are made of an aluminum material, more particularly, an aluminum alloy, and are integrally formed with each other.

It will be appreciated that the rotor frame is preferably formed by a die-casting method that is suitable for mass production.

Meanwhile, in the present embodiment, a supporter 17 may be interposed between the rear wall surface 200 of the tub 2 and the stator 14. The supporter 17 serves to increase a coupling strength between the tub 2 and the stator 14.

Also, in the present embodiment, it is preferable that a bearing housing 7 be provided at the rear wall surface 200 of the tub 2 and used to receive bearings therein for rotatably supporting the shaft 4.

Here, the stator 14 may be coupled fixedly to the rear wall surface 200 of the tub 2 through the bearing housing 7 and the supporter 17.

The bearing housing 7 is preferably made of a metallic material, and more preferably, made of an aluminum material such as an aluminum alloy. Also, preferably, the bearing housing 7 is integrally formed with the rear wall surface 200 of the tub 2 via insert injection molding when the tub 2, which is made of a plastic material, is injection molded.

Here, the bearing housing 7 may be integrally formed with the supporter 17, to perform the role of the supporter 17 additionally. In this case where the bearing housing 7 is integrally formed with the supporter 17, the supporter 17 is formed via insert injection molding during the injection molding of the tub 2. In this case, the supporter 17 may be configured in such a manner that only a portion thereof, that is to say, a coupling portion for the bearing housing 7, may be exposed rearward out of the tub 2.

Integrally forming the bearing housing 7 with the supporter 17 enables the omission of a coupling process of the bearing housing 7 or supporter 17, which has been conventionally performed in an assembling line in the course of securing the stator 14 to the rear wall surface 200 of the tub 2. This has the effect of reducing manufacturing costs of the washing machine.

Meanwhile, the metallic bearing housing 7 is formed, at different positions of an inner circumference thereof, with short-stepped portions 8a and 8b. The short-stepped portions 8a and 8b serve to support front and rear bearings 6a and 6b, respectively, installed on the inner circumference thereof, so as to prevent the respective bearings 6a and 6b from being separated from the bearing housing 7.

In this case, of the short-stepped portions 8a and 8b formed along the inner circumference of the bearing housing 7, the short-stepped portion 8a, which is formed at a front position, has an "L"-shaped form suitable to support a rear end of the front bearing 6a that is installed on the outer circumference of a front end of the shaft 4. On the other hand, the short-stepped portion 8b, which is formed at a rear position, has an "L"-shaped form suitable to support a front end of the rear bearing 6b that is installed on the outer circumference of a rear end of the shaft 4.

The shaft 4 is partially located in the bearing housing 7 and adapted to transmit the drive force of the motor 5 to the drum 3. The shaft 4 is formed, at front and rear positions on the outer circumference thereof, with positioning short-stepped portions 9a and 9b for determining the installation positions of the front and rear bearings 6a and 6b relative to the shaft 4.

The front end of the shaft 4 is coupled to a spider 10 that is provided at a rear wall portion of the drum 3. Also, to prevent the shaft 4 from gathering rust thereon, a brass bushing 11 is press fitted around a portion of the shaft 4 extended between the spider 10 and the front bearing 6a at the outside of the bearing housing 7. Here, the bushing 11 is provided, around an outer circumference thereof, with a sealing member 12 for completely preventing permeation of moisture into the bearings 6a and 6b.

The rotor 13, which constitutes a part of a direct connection motor 5, is coaxially coupled to the rear end of the shaft 4. The stator 14 is located inside the rotor 13 so as to constitute the direct connection motor 5 along with the rotor 13. Here, the stator 14 is coupled fixedly to the rear wall surface 200 of the tub 2.

In the present embodiment, the rotor frame is made of an aluminum material. As shown in FIGS. 3 and 4, the side wall portion 13b of the rotor frame, which is extended forward from an edge of the rear wall portion 13a, is preferably formed, along a circumferential direction thereof, with a ledge having a seating plane 130 for supporting the magnets 13c that are attached to an inner surface of the side wall portion 13b over a front portion of the inner surface. Also, preferably, the rear wall portion 13a of the rotor frame is centrally formed with a hub 132. Here, the hub 132 has a center through-hole 131 for allowing a coupling member 15b, such as a bolt, etc., to pass therethrough in order to couple the rotor 13 to the shaft 4.

Of course, it will be appreciated that the magnets 13c are not essentially intended to be supported on the seating plane 130, and in the case of small capacity magnets, they may be coupled to the inner surface of the side wall portion 13b at a position spaced apart upward from the seating plane 130 by a predetermined height.

As shown in FIG. 4, the rotor frame is preferably configured in such a manner that the side wall portion 13b is integrally formed with the rear wall portion 13a and the rotor frame is formed by die casting an aluminum material.

Around the hub 132 of the rotor frame are radially formed a plurality of cooling fins 133. The cooling fins 133 serve to blow air toward the stator 14 during rotation of the rotor 13, so as to remove heat generated in the stator 14. In this case, each of the cooling fins 133 is formed to have a predetermined length in a radial direction of the rotor frame.

Preferably, the cooling fins 133 are integrally formed with the rotor frame and extend radially from the hub 132 to the ledge to have a height difference between the hub 132 and the seating plane 130 of the ledge. On the basis of the height difference, the cooling fins 133 can be linearly formed or curved convexly or concavely. With this configuration, the cooling fins 133 can act to blow air concentratively to specific portions of the stator 14 having the highest cooling requirement.

Although FIG. 4 illustrates that the cooling fins 133 are configured to have the highest height at the side of the ledge 130, it will be appreciated that, conversely, the cooling fins 133 may have the highest height at the side of the hub 132. Also, it is possible that the cooling fins 133 are integrally formed with the side wall portion 13b and the rear wall portion 13a, to serve as ribs continuously connecting the hub 132 to the ledge, for the sake of reinforcing the overall strength of the rotor frame.

In the present invention, the rear wall portion 13a of the rotor frame has a plurality of vent holes 134 perforated in regions between the respective adjacent cooling fins 133. The vent holes 134 have the roles of moisture discharge and ventilation.

With the provision of the cooling fins 133 and the hub 132, the rotor frame of the present invention can achieve a reinforced rigidity. Also, it will be appreciated that the cooling fins 133 and the hub 132 can achieve the effect of simplifying the manufacture of the rotor 13 because they can be formed simultaneously with the forming of the rotor frame.

Around the center through-hole 131, which is perforated in the hub 132 of the rotor 13, are formed a plurality of coupling holes 137 and a plurality of positioning holes 138 by regular distances. The plurality of positioning holes 138 are located, respectively, between the respective adjacent coupling holes 137. The coupling holes 137 are used to couple a connector 16 to the rotor 13. Here, the connector 16 is serration-coupled onto the outer circumference of the rear end of the shaft 4 extended rearward from the rear bearing 6b at the outside of the bearing housing 7. The positioning holes 138 are used to determine the assembling position of the connector 16.

The connector 16 is made of a resin material having a different vibration mode from that of the aluminum rotor frame. Preferably, the connector 16 may be made of an insulating material and integrally formed with the rotor frame via insert molding. In this case, the coupling holes 137 and the positioning holes 138 perform the role of passage holes for allowing a part of the connector 16 to passage therethrough, in order to increase a coupling force between the connector 16 and the rotor frame.

Meanwhile, the connector 16, as shown in FIGS. 2, 6 and 7, has coupling holes 162 perforated in an edge region thereof to be distributed along a circumferential direction, to correspond to the coupling holes 137 formed in the hub 132 of the rotor 13. The connector 16 also has positioning bosses 160 integrally formed at positions between the respective adjacent coupling holes 162. As the positioning bosses 160 are inserted into the positioning holes 138 of the rotor 13, the coupling holes 137 of the rotor 13 are automatically aligned with the coupling holes 162 of the connector 16.

In addition, the connector 16 has a center hub 163, a serration 164 formed at an inner circumference of the hub 163 to be engaged with a serration 400 formed on the rear end of the shaft 4, and reinforcing ribs 161 formed at an outer circumference of the hub 163 of the connector 16 for reinforcing the strength of the hub 163.

Here, the serration 164 of the connector 16 may be formed by insert molding a member, which is made of a metallic material having a high strength and has a serration formed on an inner circumference thereof, during the forming of the connector 16.

Meanwhile, as shown in FIGS. 3 and 5, the stator 14, which constitutes the motor 5 along with the rotor 13, includes a ring-shaped insulator 140, and coils 142 wound on winding portions 141 arranged at the outside of the insulator 140. In addition, coupling ribs 143 are integrally formed with the insulator 140 to be arranged inside the insulator 140. The coupling ribs 143 serve to secure the stator 14 to the bearing housing 7.

The stator 14 further includes a stator core, which consists of the winding portions 141 around which the coils 142 are wound, and an annular body portion having a magnetic path. Here, the insulator 140 serves to insulate the stator core and the coils 142 from each other. The plurality of winding portions are spaced apart from one another by a predetermined distance in a circumferential direction of the body portion to protrude radially from the body portion.

Here, the stator core may be an annular spiral core having a multilayered structure, which is obtained by spirally winding an iron plate, consisting of the winding portions 141 and the body portion, from the lowermost layer to the uppermost layer. In this case, differently from that shown in FIG. 5, the coupling ribs 143 for coupling the stator 14 to the tub 2 may be formed only at the insulator 140. In this case, the insulator 140 has to be configured to guarantee an appropriate strength thereof. The stator 14 may be coupled to the tub 2 through coupling holes 144 formed in the respective ribs 143.

Alternatively, the stator core may take the form of an annular sectional core, which is obtained by coupling a plurality of arched stator core sections, each consisting of a plurality of arched stator core pieces stacked one above another in multiple layers, with one another.

In the present invention, preferably, the stator 14 has thirty six poles and the rotor 13 has forty eight poles. The greater the number of the poles, the easier the positional detection and control of the stator 14 and the rotor 13 can be accomplished. Here, the forty eight poles of the rotor 13 alternately define a north pole and a south pole in such a manner that twelve permanent magnets, each having a total of four poles, are coupled inside the rotor frame.

Hereinafter, the coupling of the rotor frame and the back yoke included in the drum type washing machine according to the present invention will be described in detail.

First, in the present invention, the back yoke may be formed by stacking annular iron plates, preferably, annular silicon steel plates, which has substantially the same width as a desired radial thickness of the back yoke, one above another.

To reduce the loss of a material required for the manufacture of the back yoke, alternatively, the back yoke may be formed by spirally winding an iron plate band, which has substantially the same width as a desired thickness of the back yoke, from the lowermost layer to the uppermost layer, to have a multilayered annular structure. That is to say, the back yoke may be manufactured to have the same shape as the above described shape of the spiral core of the stator core.

Alternatively, the back yoke may be formed by rolling an iron plate, which has a thinner thickness than the desired radial thickness of the back yoke, multiple times, to have a multilayered structure in a radial direction. Even by the above described configuration, a reduction in the loss of a material can be expected.

When forming the back yoke by use of a predetermined thickness iron plate to have a multilayered structure as stated above, the back yoke of the present invention has the effect of minimizing the leakage of a magnetic flux and accordingly, is capable of performing the role of an efficient back yoke. This is because the multilayered back yoke can minimize the leakage of a magnetic flux in a direction perpendicular to the generation direction of a magnetic flux.

Meanwhile, the back yoke is made of an iron plate and thus, has a difficulty to be coupled to the aluminum rotor frame by welding. Accordingly, now, a desired method for coupling the iron back yoke to the aluminum rotor frame according to different preferred embodiments of the present invention will be described.

First, it should be noted that the back yoke and the rotor frame must have a coupling strength sufficient to prevent not only idling rotations of the rotor frame and the back yoke, in consideration of the fact that a rotating force of the back yoke and the magnets has to be transmitted to the shaft through the rotor frame, but also scattering and separation of the back yoke from the rotor frame. In conclusion, the back yoke and the rotor frame must have a highly reliable coupling strength therebetween.

In a first embodiment of the present invention, to provide the reliable coupling strength, the back yoke is press fitted inside and secured fixedly to the side wall portion of the rotor frame.

Figure 8:
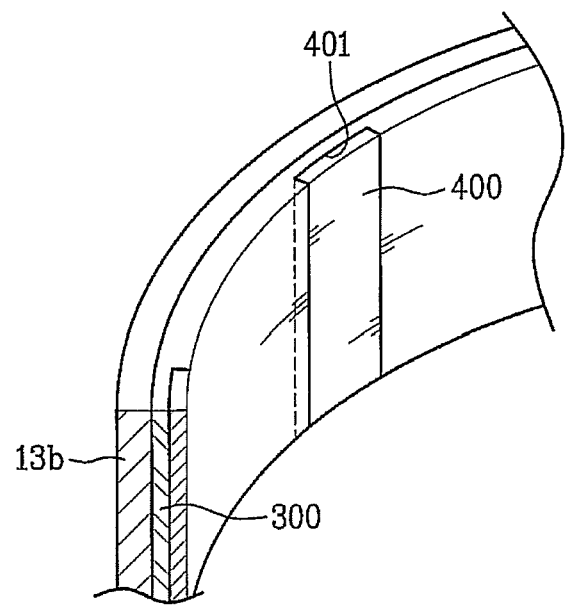
FIG. 8 is a partially cut-away perspective view schematically illustrating the coupling configuration of a rotor frame and a back yoke according to a first embodiment of the present invention.

Specifically, the rotor frame, as shown in FIG. 8, may comprise a plurality of protrusions 400, which are arranged inside the side wall portion 13b to be circumferentially spaced apart from one another by a predetermined distance.

The protrusions 400 are spaced apart in a radial inward direction from the inner circumference of the side wall portion 13*b* to have a predetermined radial gap with the side wall portion 13*b*. Thereby, the back yoke 300 is able to be press fitted and secured fixedly in the radial gap.

Preferably, the back yoke 300 is formed, at an inner circumference thereof, with recesses 401 corresponding to the protrusions 400, to allow the protrusions 400 to be inserted into the recesses 401. Thereby, the back yoke 300 can be inserted and coupled inside the side wall portion 13*b* of the rotor frame. With the engagement of the protrusions 400 and the recesses 401, consequently, it is possible to efficiently prevent the idling rotations of the rotor frame and the back yoke 300 during rotation of the rotor 30.

Preferably, the protrusions 400 are integrally formed with the rotor frame. More preferably, the protrusions may be formed simultaneously with the die casting of the rotor frame. Also, preferably, the plurality of protrusions are spaced apart from one another by a predetermined distance along a circumferential direction of the rotor frame.

Although FIG. 8 illustrates that the protrusions 400 have the same height as that of the side wall portion 13*b*, but the present invention is not limited thereto, and the protrusions 400 may have a smaller height than that of the side wall portion 13*b*.

Meanwhile, to achieve a further increase in the coupling strength between the back yoke 300 and the rotor frame, it is preferable that an adhesive is applied to coupling surfaces of the rotor frame and the back yoke when the back yoke is inserted and coupled inside the side wall portion 13*b* of the rotor frame. Of course, it will be appreciated that the magnets may be coupled to the inner circumference of the back yoke by use of an adhesive so that they are arranged in a circumferential direction of the back yoke.

Hereinafter, the assembling procedure and operation of the drive unit included in the washing machine according to the present invention will be described.

First, in the washing machine according to the present invention, the tub 2 is made of a plastic material having a superior heat resistance property. Injection molding the tub 2 by use of the light-weight material is advantageous to improve the productivity of the washing machine.

Also, the bearing housing 7 as bearing supporting means is made of a metallic material, such as an aluminum alloy, etc. This enables the present invention to be applied to washing machines having a high-temperature drying function, without the risk of thermal deformation.

In the present embodiment, the metallic bearing housing 7 is integrally formed with the tub 2 as it is insert molded into a hub 201 formed in the rear wall portion 200 of the tub 2 during the injection molding of the plastic tub 2. Accordingly, there is no need for assembling the bearing housing 7 to the rear wall surface 200 of the tub 2, and the overall assembling process of the tub 2 can be simplified.

Meanwhile, the rotor 13 is coupled to the center of the rear end of the shaft 4 and in turn, the stator 14 is located inside the rotor 13, to constitute the direct connection motor 5. The side wall portion 13*b* of the rotor 13, which is extended forward from the edge of the rear wall portion 13*a*, is formed, in a circumferential direction thereof, with the ledge having the magnet seating plane 130. Accordingly, when the magnets 13*c* are attached to an inner surface of the rotor 13, they can be supported by the seating plane 130 of the ledge. This has the effect of facilitating the manufacture of the rotor 13.

Here, the rotor frame is formed by die casting an aluminum material, resulting in a simplified manufacturing process. Also, since the rotor frame has a light-weight as well as an anti-rust function, it is possible to minimize the power loss of the motor due to the inertia force of the rotor frame and to achieve an improvement in processibility for any subsequent process. In addition, it is easy to provide the rotor frame with an additional rigidity reinforcement structure.

Also, by press fitting and coupling the annular back yoke, which is made of an iron plate, to the aluminum rotor frame, it is possible to achieve an increased coupling strength between the back yoke and the rotor frame. In this case, an adhesive may be additionally used to achieve a further increase in the coupling strength.

Hereinafter, a drum type washing machine according to a second embodiment of the present invention will be described in detail with reference to FIG. 9. The present embodiment has approximately the same configuration as that of the above described first embodiment and thus, the description of the same configuration will be omitted.

A difference between the present embodiment and the above described first embodiment is a method for coupling the back yoke to the rotor frame. Specifically, in the present embodiment, the back yoke is press fitted and coupled fixedly inside the side wall portion of the rotor frame without the aid of any auxiliary means, but is not essentially intended to be press fitted to the rotor frame. That is to say, the back yoke may be coupled to the rotor frame as protrusions are inserted into their corresponding recesses, respectively.

Figure 9:
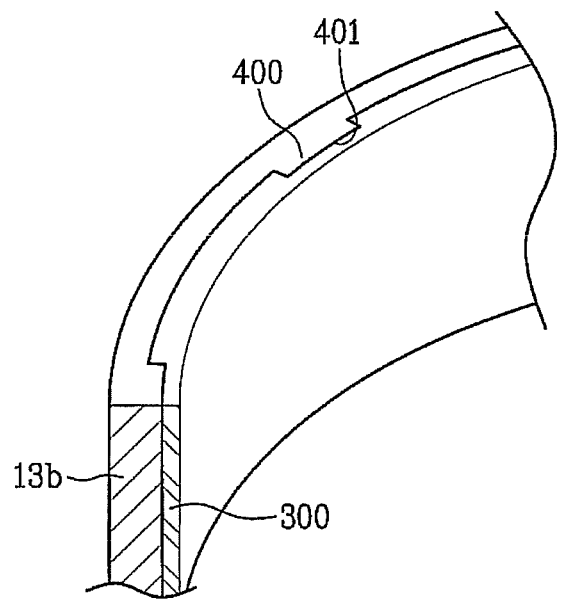
FIG. 9 is a partially cut-away perspective view schematically illustrating the coupling configuration of a rotor frame and a back yoke according to a second embodiment of the present invention.

For this, the rotor frame of the present embodiment, as shown in FIG. 9, has the recesses 401 formed at an outer surface of the back yoke in a radial direction and the protrusions 400 formed at an inner surface of the side wall portion of the rotor frame. As the protrusions 400 are engaged in the recesses 401, the back yoke can be coupled fixedly inside the side wall portion of the rotor frame.

With the engagement of the protrusions and the recesses, it is possible to more efficiently prevent idling rotations of the rotor frame and the back yoke during rotation of the rotor.

Preferably, the protrusions 400 are integrally formed with the rotor frame to constitute a portion of the side wall portion 13*b*. More preferably, the protrusions 400 may be formed simultaneously with the die casting of the rotor frame.

The plurality of protrusions 400 are preferably spaced apart from one another by a predetermined distance along a circumferential direction of the rotor frame.

Although FIG. 9 illustrates that the protrusions 400 have the same height as that of the side wall portion 13*b*, but the present invention is not limited thereto, and the protrusions 400 may have a smaller height than that of the side wall portion 13*b*.

Specifically, the protrusions 400 may be extended from a surface of the rear wall portion 13*a* by a predetermined height smaller than the height of the side wall portion, or may be extended from a surface of the ledge having the seating plane 130 by a predetermined height smaller than the height of the side wall portion.

Alternatively, the recesses 401 of the back yoke may be replaced by slots perforated through the thickness of the back yoke. In this case, the protrusions 400 of the rotor frame are inserted through the slots.

In other words, the back yoke may be perforated, in a lower end portion thereof, with a plurality of slots in such a manner that the slots are spaced apart from one another by a regular distance in a circumferential direction of the back yoke, to allow the protrusions 400 to be inserted through the slots.

Preferably, the plurality of protrusions are spaced apart from one another by a predetermined distance in a circumferential direction of the rotor frame.

To guarantee an increased coupling strength between the back yoke and the rotor frame, it is preferable that an adhesive be applied to coupling surfaces of the rotor frame and the back yoke when the back yoke is inserted and coupled inside the side wall portion of the rotor frame. Of course, the magnets may be coupled to the back yoke by use of an adhesive so that they are arranged inside the back yoke in a circumferential direction.

Figure 10:
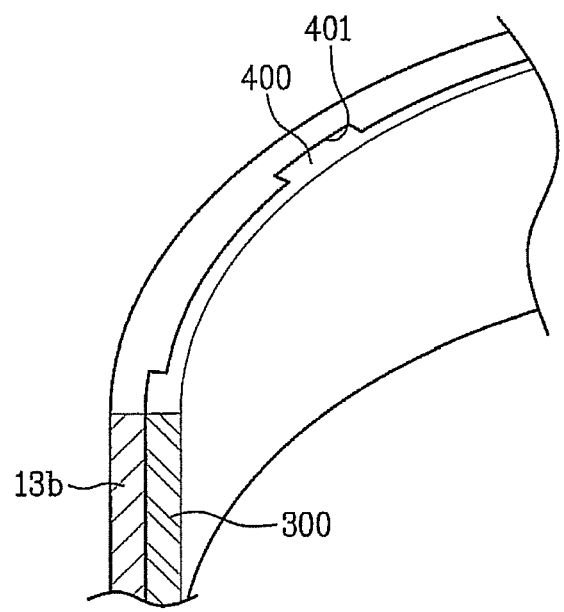
FIG. 10 is a partially cut-away perspective view schematically illustrating the coupling configuration of a rotor frame and a back yoke according to a third embodiment of the present invention.

Hereinafter, a drum type washing machine according to a third embodiment of the present invention will be described in detail with reference to FIG. 10. The present embodiment has approximately the same configuration as that of the above described second embodiment and thus, the description of the same configuration will be omitted.

A difference between the present embodiment and the above described second embodiment is in that the protrusions 400 are formed at the back yoke and the recesses 401 are formed at the rotor frame. Accordingly, the back yoke is coupled fixedly to the rotor frame via engagement between the protrusions 400 and the recesses 401.

In conclusion, it will be appreciated by those skilled in the art that an important feature of the present invention is the provision of the protrusions 400 and the recesses 401 corresponding to each other. In other words, if the protrusions 400 are formed at the back yoke, the recesses may be formed at the rotor frame, and conversely, if the protrusions 400 are formed at the rotor frame, the recesses may be formed at the back yoke.

Hereinafter, a drum type washing machine according to a fourth embodiment of the present invention will be described. The present embodiment may be easily understood with reference to FIG. 4.

The present embodiment has a feature in that the annular back yoke is coupled fixedly inside the side wall portion of the rotor frame as it is inserted into a mold of the rotor frame during the die casting of the rotor frame.

This has the effect of increasing the coupling strength between the back yoke and the rotor frame as a molten metal is solidified similar to an insert injection molding method.

The implementation of the above described method is possible because a fusion point of the rotor frame is lower than that of the back yoke.

To achieve a further increase in the coupling strength, the back yoke may be formed, at the outer surface thereof, with grooves (not shown) or protuberances (not shown), to provide the back yoke with a stepped outer surface.

Specifically, a plurality of grooves or protuberances may be spaced apart from one another by a predetermined distance in a circumferential direction of the back yoke, and the height of the grooves or protuberances may be equal to the height of the side wall portion of the rotor frame.

Of course, the grooves or protuberances may have a height smaller than that of the side wall portion of the rotor frame, and may be positioned at approximately the middle height of the back yoke.

Forming the grooves or protuberances at a middle portion of the back yoke, furthermore, has the effect of completely preventing idling rotation as well as scattering of the back yoke.

Meanwhile, after coupling the back yoke with the magnets, the assembly of the back yoke and the magnets may be inserted into the mold of the rotor frame.

Also, the side wall portion of the rotor frame may be configured in such a manner that an upper end of the side wall portion is extended in a radial inward direction by a predetermined length sufficient to cover upper ends of the back yoke and the magnets. Although not shown in FIG. 4, specifically, the upper end of the side wall portion 13b may be configured to be bent in a radial inward direction to cover the back yoke 300. Of course, preferably, the upper end of the side wall portion may be extended in a radial inward direction to cover even the magnets located inside the back yoke.

By providing the upper end of the side wall portion of the rotor frame with the above described configuration, it is possible to efficiently prevent the scattering of the back yoke and the magnets.

It will be apparent to those skilled in the art that various modifications and variations, related to the size, shape, and material of the constituent elements, can be made in the present invention without departing from the spirit or scope of the invention. Thus, it is intended that the present invention covers the modifications and variations of this invention provided they come within the scope of the appended claims and their equivalents.

What is claimed is:

1. A washing machine, comprising:
a tub configured to receive washing fluid therein;
a drum rotatably installed in the tub; and
a shaft that penetrates the drum and is connected to the drum, wherein the shaft is configured to transmit a drive force generated by a motor to the drum, the motor including a stator provided on a rear wall portion of the tub and a rotor surrounding an outside of the stator, the rotor including:
at least one magnet;
an annular back yoke that defines a magnetic path; and
a rotor frame rotatably positioned at the outside of the stator, wherein the rotor frame comprises:
a side wall portion that supports the at least one magnet and the annular back yoke;
a rear wall portion integrally formed with the side wall portion, wherein the rear wall portion of the rotor frame transmits a rotating force of the rotor to the shaft; and
a plurality of protrusions integrally formed with the rear wall portion of the rotor frame and arranged within the rotor frame,
wherein the side wall portion of the rotor frame, the rear wall portion of the rotor frame, and the plurality of protrusions are integrally formed with each other,
wherein the plurality of protrusions protrude from the rear wall portion of the rotor frame in a direction corresponding to an inner circumferential surface of the side wall portion of the rotor frame, and are arranged circumferentially, confronting the inner circumferential surface of the side wall portion of the rotor frame, with adjacent protrusions spaced apart from each other by a first predetermined distance along the inner circumferential surface of the rotor frame,
and wherein the plurality of protrusions are also space radially inward from the side wall portion of the rotor frame by a second predetermined distance so as to form a gap therebetween such that the back yoke is positioned in the gap formed between the inner circumferential surface of the side wall portion of the rotor frame and the plurality of protrusions and the plurality of protrusions support the back yoke in a position against the side wall portion of the rotor frame.

2. The washing machine according to claim 1, further comprising an adhesive provided at corresponding coupling surfaces of the rotor frame and the back yoke.

3. The washing machine according to claim 1, wherein the back yoke comprises a radially multilayered structure including multiple layers of a rolled iron plate, each layer having a thickness that is less than a desired thickness of the back yoke.

4. The washing machine according to claim 1, wherein the back yoke comprises a spirally wound iron band that has substantially the same width as a desired thickness of the back yoke, from a lowermost layer to an uppermost layer of the back yoke that forms a vertical multilayered structure of the back yoke.

5. The washing machine according to claim 1, wherein the plurality of protrusions extend from the rear wall portion of the rotor frame in a direction that is substantially parallel to the side wall portion of the rotor frame.

6. The washing machine according to claim 1, wherein the at least one magnet is attached to an inner circumferential surface of the back yoke by an adhesive and is arranged in a circumferential direction of the back yoke.

7. The washing machine according to claim 1, wherein the back yoke is inserted into a mold of the rotor frame, to thereby be coupled fixedly inside the gap.

8. A washing machine, comprising:
a tub configured to receive washing fluid therein;
a drum rotatably installed in the tub; and
a shaft that penetrates the drum and is connected to the drum, wherein the shaft is configured to transmit a drive force generated by a motor to the drum, the motor including a stator provided on a rear wall portion of the tub and a rotor surrounding an outside of the stator, the rotor including:
at least one magnet;
an annular back yoke that defines a magnetic path; and
a rotor frame rotatably positioned at the outside of the stator, wherein the rotor frame comprises:
a side wall portion that supports the at least one magnet and the annular back yoke;
a rear wall portion integrally formed with the side wall portion, wherein the rear wall portion of the rotor frame transmits a rotating force of the rotor to the shaft; and
a plurality of protrusions integrally formed with the rear wall portion of the rotor frame by die casting and arranged within the rotor frame,
wherein the side wall portion of the rotor frame, the rear wall portion of the rotor frame, and the plurality of protrusions are integrally formed with each other by die casting,
wherein the plurality of protrusions protrude from the rear wall portion of the rotor frame in a direction corresponding to an inner circumferential surface of the side wall portion of the rotor frame, and are arranged circumferentially, confronting the inner circumferential surface of the side wall portion of the rotor frame, with adjacent protrusions spaced apart from each other by a first predetermined distance along the inner circumferential surface of the rotor frame,
and wherein the plurality of protrusions are also space radially inward from the side wall portion of the rotor frame by a second predetermined distance so as to form a gap therebetween such that the back yoke is positioned in the gap formed between the inner circumferential surface of the side wall portion of the rotor frame and the plurality of protrusions and the plurality of protrusions support the back yoke in a position against the side wall portion of the rotor frame.

9. The washing machine according to claim 8, wherein the back yoke is formed by rolling an iron plate having a smaller thickness than a desired thickness of the back yoke multiple times, to have a radially multilayered structure.

10. The washing machine according to claim 8, wherein the back yoke is formed by spirally winding an iron band having substantially the same width as a desired thickness of the back yoke from a lowermost layer to an uppermost layer, to have a vertically multilayered structure.

11. The washing machine according to claim 8, wherein an adhesive is applied to coupling surfaces of the rotor frame and the back yoke.

12. The washing machine according to claim 8, the back yoke is fit inside the gap.

13. The washing machine according to claim 8, the back yoke is inserted into a mold of the rotor frame before the die casting, to thereby be coupled fixedly inside the gap.

* * * * *